April 6, 1954        E. G. DE MOTT        2,674,707
DAMPING SYSTEM FOR ELECTRICAL SERVO MECHANISMS
Filed May 15, 1950                                2 Sheets-Sheet 1

INVENTOR:-
Elmer G. DeMott,
BY Pierce, Scheffler & Parker,
ATTORNEYS.

April 6, 1954     E. G. DE MOTT     2,674,707

DAMPING SYSTEM FOR ELECTRICAL SERVO MECHANISMS

Filed May 15, 1950     2 Sheets-Sheet 2

INVENTOR:-
Elmer G. De Mott,

BY Pierce, Scheffler & Parker,
ATTORNEYS.

Patented Apr. 6, 1954

2,674,707

UNITED STATES PATENT OFFICE 2,674,707

DAMPING SYSTEM FOR ELECTRICAL SERVO MECHANISMS

Elmer G. De Mott, Elizabeth, N. J., assignor to Weston Electrical Instrument Corporation, Newark, N. J., a corporation of New Jersey Application May 15, 1950, Serial No. 161,976

11 Claims. (Cl. 318—29)

This invention relates to electrical servo-mechanisms and more particularly to servo-mechanisms of relay or power-actuated type which may be adjusted with greater precision than prior electrical servo-mechanisms.

The power output of electrical servo-mechanisms is a significant error voltage at the receiver, due to a manual or an automatic adjustment of a transmitter element, which is impressed upon an error detecting device, specifically a phase-sensitive relay, to control the energization of a reversible motor which drives an adjustable element of the receiver to eliminate the voltage error, i. e. to displace the adjustable element of the receiver to duplicate, on a linear or multiplied basis, the displacement of the adjustable element of the servo-mechanism transmitter. The prior servo-mechanisms of this general type have been open to the objection that the time delay in the operation of the control elements and the inertia of the motor preclude a close adjustment of the receiver in accordance with the manual or automatic adjustment of the control element of the transmitter.

An object of the invention is to provide electrical servo-mechanisms which operate with greater precision than prior servo-mechanisms of relay or power-actuated type. An object is to provide electrical servo-mechanisms of relay or power-actuated type which track or reproduce mechanical displacements of the transmitter more quickly, and with higher accuracy than was possible with prior servo-mechanisms of the same general type. An object is to provide electrical servo-mechanisms of the auxiliary motor type which include circuit elements for anticipating a balance of the servo-mechanism circuit, thereby to preclude over-shooting and "hunting" of the motor which drives the significant element of the receiver mechanism.

These and other objects and the advantages of the invention will be apparent from the following specification when taken with the accompanying drawings in which.

Figure 1:
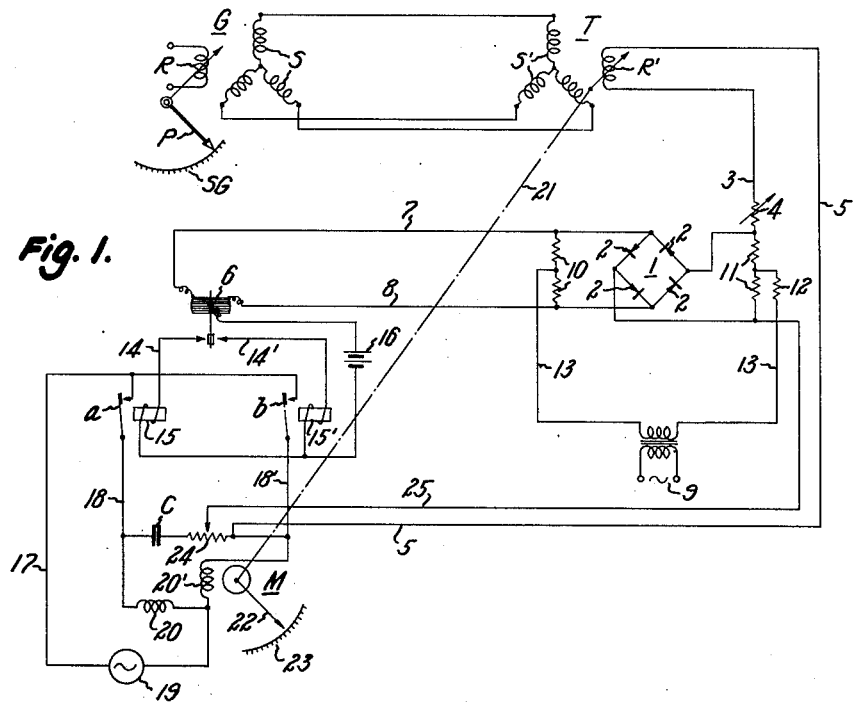
Fig. 1 is a circuit diagram of an electrical servo-mechanism embodying the invention.

The servo-mechanism shown in Fig. 1 is energized by alternating current and includes a synchro-generator G at the transmitter and a similar apparatus or control transformer T at the receiver. The rotor R of the generator is adjustable angularly within its three-coil stator winding S, and the currents induced therein are transmitted to the three-phase stator S' at the receiver to develop an error voltage across its rotor R' when the respective rotors are not in angular agreement. The error voltage is in phase with or 180° out of phase with a reference or line voltage according to the sense of the displacement of the receiver rotor R' from the angular position of the transmitter rotor R. There is, of course, no voltage across the receiver rotor R' when its angular position coincides with that of the transmitter rotor. The transmitter rotor R may be adjusted manually or automatically according to the purpose or particular application of the servo-mechanism, and it may be provided with a pointer P which moves along an arcuate scale of graduations SG to indicate the angular position of the rotor.

The error voltage is impressed across a phase-sensitive error-detecting device which, as illustrated, is a modulation bridge 1 of four rectifier elements 2 which are connected in the same sense in a series circuit to constitute the four arms of the bridge. One terminal of the receiver rotor R' is connected to a terminal of the bridge 1 by a lead 3 and a current-limiting resistor 4 which, as indicated schematically, may be adjustable to provide a degree of sensitivity control. The lead 5 from the other terminal of rotor R' was connected directly to the opposite bridge terminal according to prior practice but, in accordance with the invention, it is connected to the bridge through a source of "anticipatory" voltage, as will be described later. The output circuit of bridge 1 comprises a relay 6 which is connected across the conjugate set of bridge terminals by leads 7, 8. A reference voltage of the same frequency as that which energizes the generator rotor R is imposed upon the modulation bridge 1 from a source 9 through a second input circuit comprising center-tapped resistors, or equivalent pairs of resistors 10, 10 and 11, 11, which are shunted across the respective pairs of opposite terminals of the bridge 1. A resistor 12 of preselected fixed value may be included in the leads 13 to the junctions of 10, 10 and 11, 11.

The operational characteristics of the modulation bridge are such, as is well known, that the modulation voltage developed across the leads 7, 8 to relay 6 is a direct current voltage which varies in magnitude with the error voltage across the receiver rotor R', and varies in polarity with the sense of the angular departure of the receiver rotor R' from agreement with the position of the transmitter rotor R. The contact arm of relay 6 is thus displaced in opposite directions, according to the polarity of the bridge output, to engage one of its spaced stationary contacts which are connected, by leads 14, 14' to windings of relays 15, 15' to complete energizing circuits for the respective relays through a current source of desired type which is schematically indicated as a battery 16. The normally open contacts of relays 15, 15' are in series with leads 17 and 18 or 18' respectively from a current source 19 to the respective field windings 20, 20' of a reversible motor M which is mechanically coupled, as indicated by broken line 21, to rotor R' to adjust the same in such sense as to reduce the error voltage. The motor M also adjusts some controlled device, not shown, in accordance with the angular adjustments of the rotor R of the servo-generator G. A pointer 22 may be driven by the motor for displacement over a scale 23 to indicate the angular adjustment of the receiver rotor R' and the associated controlled device.

A phasing capacitor C is shunted across the motor field windings and, in accordance with the invention, a potentiometer 24 is in series with the condenser C. Lead 5 from a terminal of the rotor R' is connected to one terminal of the potentiometer 24, and the contact arm of the potentiometer is connected by lead 25 to the terminal of bridge 1 opposite that to which lead 3 from rotor R' is connected. The voltage drop across the effective portion of potentiometer 24 is in phase opposition to the error voltage developed across the receiver rotor.

The advantages of the Fig. 1 servo-mechanism may be most readily appreciated by first considering the method of operation of a conventional servo-mechanism, i. e. by assuming that the tap of potentiometer 24 is shifted to the extreme right to exclude the potentiometer from the circuit connecting the rotor R' to the modulation bridge 1. When the rotor R of the synchro-generator G is quickly displaced through a relatively large angle, the resulting error voltage developed across the receiver rotor R' will first increase rapidly and then decrease less rapidly when the motor M is energized to adjust the receiver R, as shown by the time-voltage curve E of Fig. 2. The instrument type relay 6 starts to close when the error voltage reaches a preselected value $a$, and the contacts are closed after a time lag during which the error voltage increases to a value $b$. The selected auxiliary relay 15 or 15' is thus energized, and its contacts close after a further time lag during which the error voltage increases to a value $c$. The motor M is now energized to displace the rotor R' in appropriate sense to reduce the angular error but, in the assumed case of a sudden and relatively large displacement of the generator rotor, the error voltage E may continue to rise before the motor reaches full speed. The instrument relay 6 starts to open when the error voltage drops to a value A which is equal to the error voltage $a$ at which the relay started to close. The relay opens after a time lag during which the error voltage decreases to value B, thus de-energizing the auxiliary relay 15 or 15' which opens after a time lag during which the error voltage falls to value C. The motor circuit is opened at point C but the momentum of the motor produces a further adjustment of the receiver rotor R', and an error voltage of opposite sense and of value D is developed before the motor comes to rest.

It is apparent that the "spread" of the contacts of the primary relay 6 must correspond to an error voltage of at least $2a$ for stability of the system since the reversed error voltage D at the end of a relatively large and sudden adjustment at the generator must be less than the critical voltage $a$ to avoid hunting. Stability is thus achieved at the expense of accuracy and sensitivity.

Figures 2, 3:
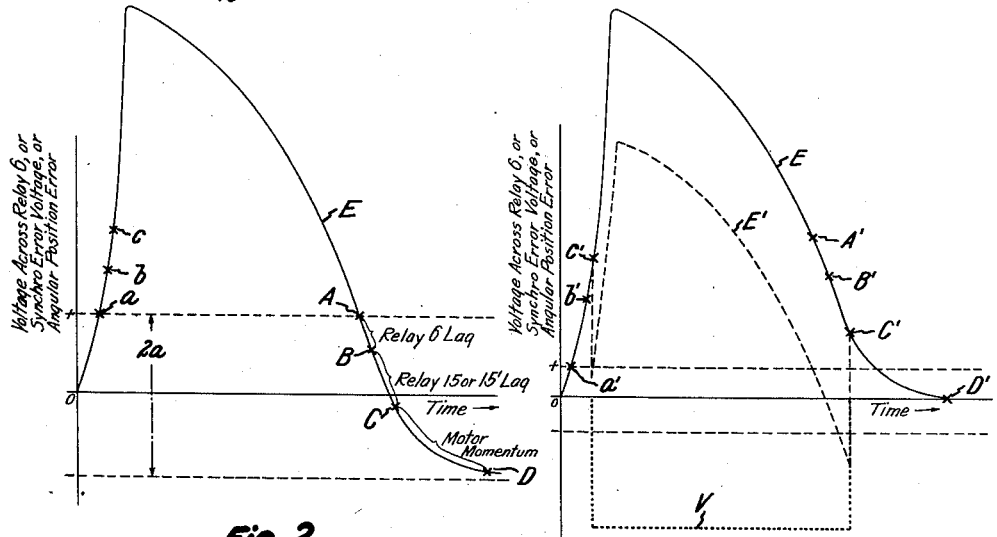
Figs. 2 and 3 are curve sheets showing operational characteristics, on a time basis, of a conventional servo-mechanism and of the apparatus illustrated in Fig. 1.

In accordance with the invention, an anticipatory voltage V is developed across the effective portion of the potentiometer 24, and the time-operational characteristics of the system are as shown in Fig. 3. For convenience of comparison, the same sudden adjustment of the generator rotor is assumed, and the initial portion of error voltage curve E is therefore identical with that of Fig. 2. The contacts of the primary relay 6 are now more closely spaced, and the relay starts to close at an error voltage value $a'$ which is substantially lower than the minimum voltage value $a$ which affords stable operation in the absence of an anticipatory voltage V. Relay 6 closes at point $b'$ on curve E, and relay 15 or 15' closes at point $c'$. The motor M is energized by the closure of relay 15 or 15', and the voltage drop V across the effective portion of potentiometer 24 is introduced into the modulation bridge 1 in series with, and in phase opposition to, the error voltage E. The voltage V will not be constant, as indicated in Fig. 3, since it will vary with the motor load and the motor staring current but, for purpose of analysis, it may well be assumed to be constant.

The effective input voltage to the modulation bridge thus drops to a lower level, as shown by curve E', as soon as the motor is energized, and the relay 6 starts to open when the error voltage E has the relatively high value A' at the instant the effective bridge input voltage E' falls to the value $a'$. Relay 6 is fully open at point B' on curve E, the auxiliary relay drops out at point C' and opens the motor circuit, and the motor comes to rest at point D'. The potentiometer 24 is so adjusted that the error voltage at point D' is substantially zero for a sudden displacement of the generator rotor R of such magnitude that the motor M reaches full speed. Tests on one embodiment of the invention demonstrated that the position error could be limited to about ±1 mechanical degree, whereas, without the anticipatory voltage, the wider spacing of the contacts of relay 6 to obtain stability in operation resulted in position errors of up to about ±5 mechanical degrees.

The introduction of an anticipatory voltage, in accordance with the invention, also increases the speed and the sensitivity or accuracy of response of the receiver to small angular displacements, or to large angular displacements at a slow rate, of the rotor R of the transmitter synchro-generator G. The speed and the sensitivity of response are increased since the stationary contacts of the primary relay 6 may be more closely spaced when anticipatory voltage V is impressed upon the error-detecting bridge on energization of the motor M. Furthermore, for a small error voltage, the introduction of the anticipatory voltage V of greater magnitude than the small error voltage, results in a reversal of the current through the primary relay and accelerates the opening of the contacts of that relay to de-energize the auxiliary relay 15 or 15'

Figure 4:
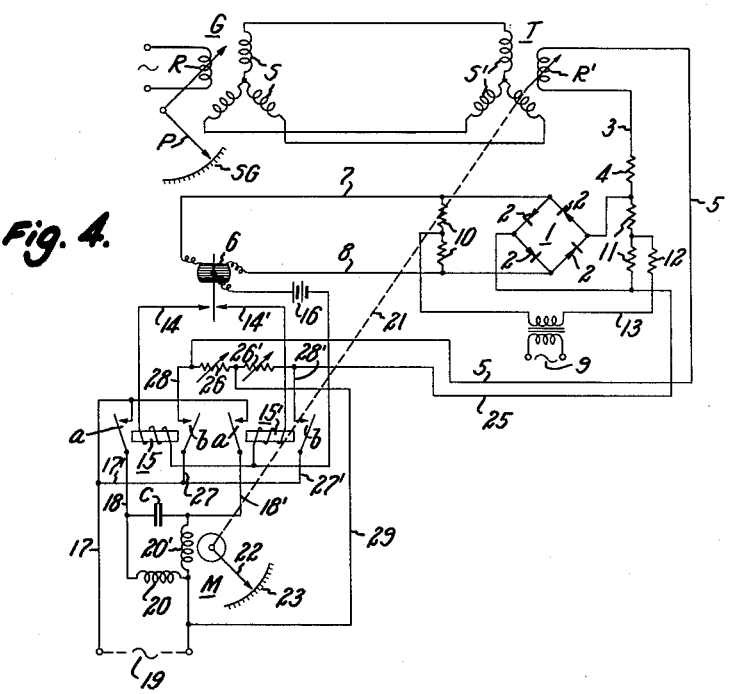
Figs. 4, 5 and 6 are circuit diagrams of other embodiments of the invention.

Another embodiment of the invention, as illustrated in Fig. 4, differs from the Fig. 1 circuit only in the arrangements for developing anticipatory voltages in phase opposition to the error voltages. Elements which are, or may be, identical with those of the Fig. 1 circuit are identified by corresponding reference numerals but will not be described in detail. The potentiometer 24 of the Fig. 1 embodiment is omitted from the Fig. 4 circuit, and a pair of resistances 26, 26' are serially connected between lead 5 from the rotor R' and lead 25 to the modulation bridge 1. The auxiliary relays 15, 15' are each provided with a second set of normally open contacts; contacts $a$ being in the motor leads 18, 18' respectively, and contacts $b$ being in series between leads 27, 27' (which are connected to lead 17 by a jumper 17') and leads 28, 28' to the outer ends of resistances 26, 26' respectively. A lead 29 extends from the junction of the resistances 26, 26' to the other side of the source 19, and alternating voltages of opposite phase are thus introduced into the bridge 1, in series with and in opposition to the error voltage, according to the auxiliary relay 15 or 15' which is energized.

The resistances 26, 26' are preferably adjustable, as indicated schematically by the arrows, and the degree of stability may be controlled over a wide range of operating conditions of the servo-mechanism. The resistances 26, 26' are individually adjustable and it is therefore possible to adjust the servo-mechanism for the same degree, or for different degrees, of stability for motor operation in different directions whether the required torques or the general operating conditions are the same or are different for rotation in opposite directions.

Figure 5:
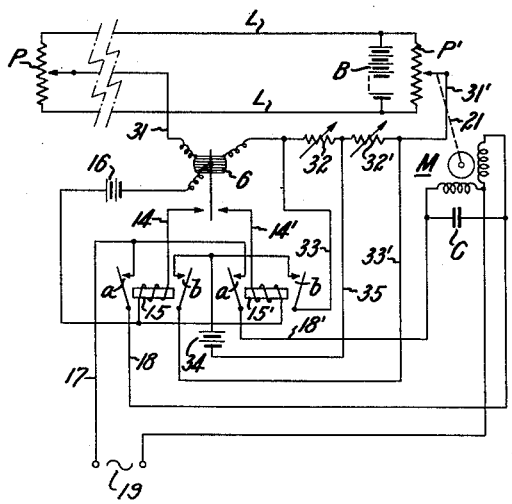

The invention may be incorporated in direct current servo-mechanism of bridge type, as illustrated in Fig. 5. The basic circuit comprises a transmitter potentiometer P and a receiver potentiometer P' connected in parallel across leads L, L from the opposite terminals of a direct current source which is shown schematically as a battery B. The primary relay 6 is connected between the contact arms of potentiometers P and P' by leads 31, 31' to form a bridge circuit in which a position error of the receiver contact arm develops an error voltage which establishes a current through the relay 6. In accordance with the invention, a pair of resistances 32, 32', preferably independently adjustable as schematically shown, are serially connected in the lead 31'. The auxiliary relay system controlled by the relay 6 may be substantially identical with that illustrated in Fig. 4 and comprises relays 15, 15' with contacts $a$ for controlling the energization of a motor M from a source 19; the motor M being mechanically coupled to the contact arm of potentiometer P' as indicated by broken line 21. The blades of the normally open contacts $b$ of relays 15, 15' are connected to the outer ends of the resistances 32 and 32' respectively, and the cooperating fixed contacts are connected through a current source 34 and lead 35 to the junction of the resistances 32, 32'.

The method of operation of this embodiment of the invention is similar to that of the Fig. 4 embodiment. When auxiliary relay 15 or 15' pulls in response to an error voltage, a circuit is completed through battery 34 and one of the resistances 32, 32' to inject an anticipatory voltage into the circuit of primary relay 6 in opposition to the initial error voltage.

Figure 6:
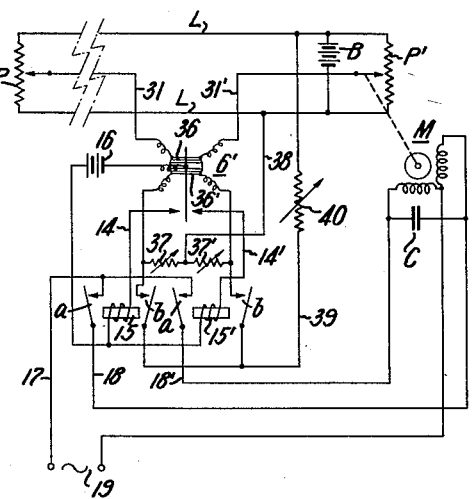

Another embodiment of the invention in a direct current servo-mechanism, as illustrated in Fig. 6, develops the anticipatory voltage from the current source B, thereby eliminating the current source 34 of the Fig. 5 apparatus. The primary relay 6' is provided with a pair of electrically independent windings; one winding 36 being connected between the contact arms of potentiometers P and P' by leads 31, 31', and the second winding 36' being energized by an anticipatory voltage to develop a torque in opposition to that established across winding 36 by an error voltage. The basic relay system is identical with that shown in Fig. 5 and includes auxiliary relays 15, 15', with sets $a$ and $b$ of normally open switch contacts, which are selectively energized by relay 6' in accordance with the sense of the displacement error. Contacts $a$ control the energization of the reversible motor M which adjusts the contact arm of the receiver potentiometer P' through circuit elements as previously described and which are identified by the corresponding reference numerals.

The circuit network by which the switch contacts $b$ of the auxiliary relays establish the anticipatory voltages include a pair of resistances 37, 37', preferably independently adjustable as indicated schematically, in series across the winding 36' of relay 6' and with their outer ends connected to one contact (as illustrated to the fixed contact) of switch contacts $b$ of relays 15 and 15' respectively. The junction of resistances 37, 37' is connected to one lead L of the direct current source B by a lead 38, and the cooperating contacts $b$ of the relays are joined and connected by a lead 39 to the other source lead L. An adjustable resistance 40 is preferably included in one of the leads 38, 39 to afford a common control for the magnitude of the anticipatory voltages developed by positional errors of opposite sense. The independently adjustable resistances 37, 37' permit separate adjustments of the degree of stability of the servo-mechanism for position errors of opposite sense.

The method of operation is similar to that of the servo-mechanism of Fig. 5. There is no current through the winding 36' of relay 6' until an auxiliary relay 15 or 15' is energized, in response to an error voltage, to close its switch contacts $a$ to complete an energizing circuit for the motor M. The switch contacts $b$ of the energized auxiliary relay are simultaneously closed to connect its associated resistance 37 or 37' across the current source B, thereby to develop a potential drop across the effective resistance 37 or 37' which establishes a current through the relay winding 36' to develop a torque in opposition to that due to the error voltage across the relay winding 36. The relay 6' thus opens at a relatively high error voltage to compensate for time lags in the relay system and for the momentum of the motor and associated controlled mechanisms.

It is apparent that there is wide latitude in the design and construction of servo-mechanisms under the invention, and that various modifications and variations of the illustrated systems fall within the spirit and scope of the invention as set forth in the following claims.

I claim:

1. In an electrical servo-mechanism, the combination with a transmitter assembly, a receiver assembly, a transmission line connecting said assemblies, each assembly including an adjustable element and the servo-mechanism being of the type in which a lack of positional identity of said adjustable elements develops an error voltage at the receiver assembly, reversible power means for displacing in opposite directions the adjustable element of the receiver assembly, and relay means including an energizing circuit into which the error voltage is injected for controlling said power means, said relay means being selectively operable to alternate closure positions in accordance with the sense of an error voltage to energize said power means for displacement of the adjustable element of the receiver assembly in a direction to reduce the error voltage injected into the energizing circuit; of error-reducing means energized on closure of relay means in each of its alternative positions to introduce into said energizing circuit an anticipatory voltage of a sense opposite to the sense of the error voltage, whereby said relay means is de-energized prior to the displacement of the adjustable element of the receiver assembly into positional identity with the adjustable element of the transmitter assembly.

2. In an electrical servo-mechanism, the invention as recited in claim 1, wherein said error-reducing means includes resistance means in said energizing circuit of said relay means, and means operative upon actuation of said relay means to energize said power means to establish a current through said resistance means to develop said anticipatory voltage.

3. In an electrical servo-mechanism, the invention as recited in claim 2, wherein said power means is an alternating current motor with a two-phase winding and a phasing capacitor, and said resistance means is a resistance in series with said phasing capacitor.

4. In an electrical servo-mechanism, the invention as recited in claim 2, wherein said resistance means comprises a pair of resistances, and said relay means includes means selectively energized in accordance with the sense of the error voltage to establish a current through one or the other of said resistances.

5. In an electrical servo-mechanism, the invention as recited in claim 1, wherein said transmitter assembly comprises a rotor winding adapted to be energized by alternating current, and a three-coil stator winding; said receiver assembly includes a three-phase stator and a rotor winding; said rotor windings being the adjustable elements of said assemblies; and said energizing circuit includes a modulation bridge having as one input circuit the rotor winding of said receiver assembly in series with resistance means constituting a part of said error-reducing means, a second input circuit including a source of alternating current, and an output circuit for impressing a direct current voltage upon said relay means.

6. In an electrical servo-mechanism, the invention as recited in claim 5, wherein said power means is an alternating current motor with two-phase windings and a phasing condenser, and said resistance means is in series with said phasing condenser.

7. In an electrical servo-mechanism, the invention as recited in claim 5, wherein said resistance means comprises a pair of resistances in series, and said error-reducing means includes means selectively actuated by said relay means for establishing an alternating current through one or the other of said resistances.

8. In an electrical servo-mechanism, the invention as recited in claim 1, wherein said transmitter and receiver assemblies are potentiometers with the adjustable contact arms thereof constituting the adjustable elements of said assemblies, and said transmission line connects said potentiometers in parallel across a direct current source; and wherein said energizing circuit connects said relay means between said potentiometer contact arms in series with resistance means constituting a part of said error-reducing means.

9. In an electrical servo-mechanism, the invention as recited in claim 8, wherein said resistance means comprises a pair of serially connected resistances, and said error-reducing means includes means selectively actuated by said relay means for establishing a current through one or the other of said resistances.

10. In an electrical servo-mechanism, the invention as recited in claim 1, wherein said transmitter and receiver assemblies are potentiometers with the adjustable contact arms thereof constituting the adjustable elements of said assemblies, and said transmission line connects said potentiometers in parallel across a direct current source, said relay means includes a primary relay with two windings, one winding being connected between said adjustable potentiometer contact arms, the second winding being shunted across a pair of resistances; and said error-reducing means including contacts actuated by said relay means for connecting said direct current source across one or the other of said resistances.

11. An electrical servo-mechanism of the type including a transmitter assembly connected to a receiver assembly, each assembly including an adjustable element and cooperating elements for developing an error voltage at the receiver assembly when the position of its adjustable element is not in preselected agreement with the position of the adjustable element of the transmitter assembly, reversible power means for displacing the adjustable element of the receiver assembly substantially to eliminate position errors and attendant voltage errors, relay means for selectively energizing said power means for operation in opposite directions according to the sense of a position error, a control circuit for said relay means, and means for introducing a developed error voltage into said control circuit; characterized by the fact that said relay means includes a first relay having a moving system comprising a coil in series in said control circuit and a contact movable between a pair of spaced contacts, a pair of relays selectively energized by said first relay to energize said reversible power means for operation in opposite directions, and means operative upon energization of either relay of said pair to energize said power means simultaneously to introduce into said control circuit an anticipatory voltage in opposition to the error voltage, thereby to compensate for the momentum of the power means and the time lag of the relay means.

References Cited in the file of this patent
UNITED STATES PATENTS

| Number | Name | Date |
|---|---|---|
| 2,432,422 | Hornfeck | Dec. 7, 1947 |
| 2,445,289 | Cherry | July 13, 1948 |
| 2,460,276 | Bernas | Feb. 1, 1949 |
| 2,475,217 | Bernas | July 5, 1949 |
| 2,528,017 | Stanton | Oct. 31, 1950 |
| 2,534,801 | Siltamaki | Dec. 19, 1950 |
| 2,574,837 | Mouzon | Nov. 13, 1951 |
| 2,645,747 | Lee | July 14, 1953 |